United States Patent
Amils et al.

(10) Patent No.: US 9,708,758 B2
(45) Date of Patent: Jul. 18, 2017

(54) HYBRID ROPE OR HYBRID STRAND

(71) Applicants: BRIDON INTERNATIONAL LTD., Doncaster, South Yorkshire (GB); DSM IP ASSETS B.V., Heerlen (NL)

(72) Inventors: Xavier Amils, Kortrijk (BE); Beste Durmus, Sint-Denijs-Westrem (BE); Paulus Johannes Hyacinthus Marie Smeets, Geule (NL)

(73) Assignees: DSM IP ASSETS B.V., Heerlen (NL); BRIDON INTERNATIONAL LTD., Doncaster (GB)

( * ) Notice: Subject to any disclaimer, the term of this patent is extended or adjusted under 35 U.S.C. 154(b) by 362 days.

(21) Appl. No.: 14/396,557

(22) PCT Filed: Apr. 15, 2013

(86) PCT No.: PCT/EP2013/057834
§ 371 (c)(1),
(2) Date: Oct. 23, 2014

(87) PCT Pub. No.: WO2013/160139
PCT Pub. Date: Oct. 31, 2013

(65) Prior Publication Data
US 2015/0113936 A1    Apr. 30, 2015

(30) Foreign Application Priority Data
Apr. 24, 2012  (EP) .................................... 12165260

(51) Int. Cl.
*D07B 1/06*   (2006.01)
*D07B 1/16*   (2006.01)
(Continued)

(52) U.S. Cl.
CPC ......... *D07B 1/0673* (2013.01); *D07B 1/0686* (2013.01); *D07B 1/0693* (2013.01);
(Continued)

(58) Field of Classification Search
CPC .. D01B 1/0673; D01B 1/0686; D01B 1/0693; D07B 5/00; D07B 3/00
(Continued)

(56) References Cited

U.S. PATENT DOCUMENTS 338,913 A * 3/1886 Batchelor .............. D07B 5/007
138/131
2,136,865 A * 11/1938 Reed .................... D07B 1/0686
57/220

(Continued)

FOREIGN PATENT DOCUMENTS

EP    0 293 263 A1    11/1988
JP    53-122842 A    10/1978
(Continued)

*Primary Examiner* — Shaun R Hurley
(74) *Attorney, Agent, or Firm* — Foley & Lardner LLP (57) ABSTRACT

A hybrid rope (40) or a hybrid strand (50) comprising a core element (42, 52), a first (44, 54) and a second (46, 56) metallic closed layer surrounding said core element (42, 52). The core element (42, 52) includes a bundle of synthetic yarns. The first metallic closed layer (44, 54) includes a plurality of first strands of wires helically twisted together with the core element (42, 52) in a first direction. The second metallic closed layer (46, 56) includes a plurality of second wires or strands helically twisted together with said core element (42, 52) and said first metallic closed layer (44, 54) in a second direction. The cross-sectional area of the core element (42, 52) is larger than the total cross-sectional area of the first (44, 54) and second (46, 56) metallic closed layers. A corresponding method of producing such a hybrid rope or hybrid strand is also disclosed.

15 Claims, 4 Drawing Sheets

(51) Int. Cl.
  *F16G 11/04* (2006.01)
  *D07B 3/00* (2006.01)
  *D07B 5/00* (2006.01)
  *D07B 7/16* (2006.01)

(52) U.S. Cl.
  CPC ............. *D07B 1/162* (2013.01); *D07B 3/00* (2013.01); *D07B 5/00* (2013.01); *D07B 7/16* (2013.01); *F16G 11/042* (2013.01); *D07B 1/165* (2013.01); *D07B 2201/102* (2013.01); *D07B 2201/108* (2013.01); *D07B 2201/1016* (2013.01); *D07B 2201/1036* (2013.01); *D07B 2201/1064* (2013.01); *D07B 2201/1068* (2013.01); *D07B 2201/1072* (2013.01); *D07B 2201/202* (2013.01); *D07B 2201/203* (2013.01); *D07B 2201/204* (2013.01); *D07B 2201/209* (2013.01); *D07B 2201/2019* (2013.01); *D07B 2201/2023* (2013.01); *D07B 2201/2027* (2013.01); *D07B 2201/2051* (2013.01); *D07B 2201/2055* (2013.01); *D07B 2201/2057* (2013.01); *D07B 2201/2065* (2013.01); *D07B 2201/2068* (2013.01); *D07B 2201/2074* (2013.01); *D07B 2201/2087* (2013.01); *D07B 2205/205* (2013.01); *D07B 2205/2014* (2013.01); *D07B 2205/2096* (2013.01); *D07B 2401/2055* (2013.01); *D07B 2401/2085* (2013.01); *D07B 2501/2007* (2013.01); *D07B 2501/2015* (2013.01); *D07B 2501/2061* (2013.01)

(58) Field of Classification Search
  USPC ......................................................... 57/216
  See application file for complete search history.

(56) References Cited

U.S. PATENT DOCUMENTS

| | | | | |
|---|---|---|---|---|
| 2,193,429 | A * | 3/1940 | McConnell | H01B 3/082 174/131 A |
| 3,092,956 | A * | 6/1963 | Naysmith | D07B 1/0673 57/214 |
| 3,231,665 | A * | 1/1966 | Grimes, Jr. | D07B 1/0693 174/108 |
| 3,977,174 | A * | 8/1976 | Boileau | B60C 9/0028 57/212 |
| 4,034,547 | A * | 7/1977 | Loos | D07B 1/0693 57/211 |
| 4,226,078 | A * | 10/1980 | Ohta | D07B 1/068 57/213 |
| 4,317,000 | A * | 2/1982 | Ferer | H01B 7/182 138/130 |
| 5,797,254 | A * | 8/1998 | Walton | D07B 1/0686 57/216 |
| 6,412,264 | B1 * | 7/2002 | De Josez | B66B 7/06 57/217 |
| 6,563,054 | B1 * | 5/2003 | Damien | D07B 1/165 174/120 C |
| 2013/0145739 | A1 * | 6/2013 | Smeets | F16G 11/042 57/212 |
| 2014/0027211 | A1 * | 1/2014 | Wesson | B66B 7/06 187/414 |
| 2015/0144245 | A1 * | 5/2015 | Bucher | B60C 15/04 152/547 |
| 2015/0247285 | A1 * | 9/2015 | Amils | D07B 1/005 57/221 |

FOREIGN PATENT DOCUMENTS

WO  WO 2011/083126 A1  7/2011
WO  WO 2011/154415 A1  12/2011

* cited by examiner

--Prior Art--

HYBRID ROPE OR HYBRID STRAND

TECHNICAL FIELD

The invention relates to a hybrid rope comprising a core element and outer metallic closed layers, to the termination of the rope and to a method of producing such a hybrid rope.

BACKGROUND ART

Conventional wire ropes and cables normally feature a metallic core surrounded by an outer layer of helically laid steel wire or wire strands. The cable with metallic core has a disadvantage of being exceedingly heavy in long lengths.

Therefore, ropes with a core of natural or synthetic fibers twisted together with metallic wire strands, i. e. so called hybrid ropes, are introduced to impart various characteristics to the ropes depending on the type of natural or synthetic fibers used.

An advantage of a hybrid rope in view of a fully steel rope is the lower weight of the rope and improved performance like e.g. tension and bending fatigue.

The advantage of the hybrid rope in view of a fully synthetic rope, e.g. nylon, is that the hybrid rope is highly resistant to abrasion, crushing and stretch while also exhibiting the desired characteristics of toughness and excellent impact strength.

Figure 1:
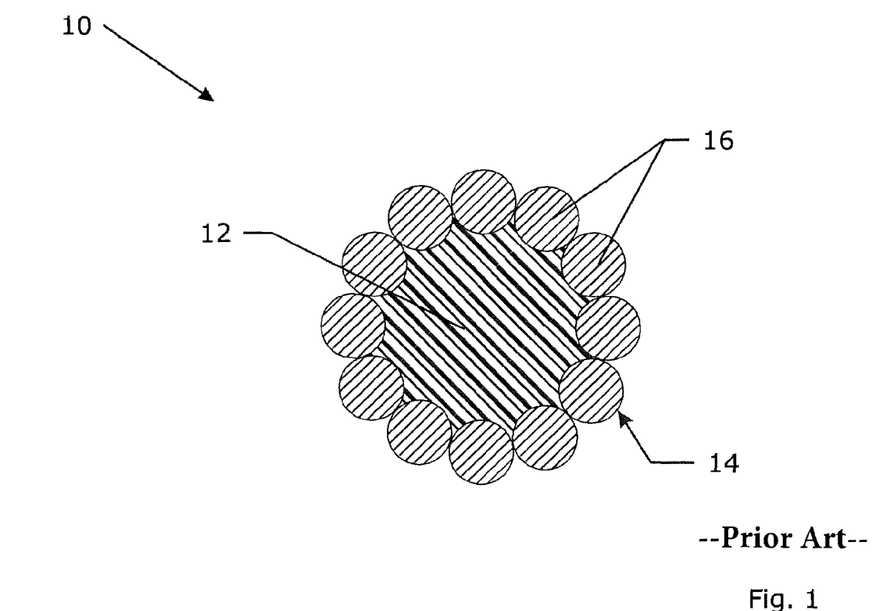
FIG. 1 is a cross-section of a prior art hybrid rope.

U.S. Pat. No. 4,034,547 discloses a composite cable 10 which comprise a synthetic core 12 and a metal jacket 14 as illustrated in FIG. 1. The synthetic core 12 is formed of a bundle or construction of high performance fibers and the jacket 14 is formed of a plurality of wires or wire strands 16. This patent further discloses that a weight approximate 30% lighter than the weight of the corresponding size steel cable can be achieved by the composite cable.

The advantage of hybrid ropes comes into effect in particular in the case of ropes of great length for suspended use, such as hauling or hoisting ropes in mining, cranes and elevators, aerial ropes or ropes for deep sea installations or use in marine and commercial fishing applications, and offshore mooring. This is because, during such use, the weight of rope by itself already takes up a large part of its load-bearing capacity and winch load capacity; the payload is correspondingly limited. Therefore, hybrid ropes are desirable in these operations since they provide comparable performance with steel ropes and lower weight expanding the possibilities, e.g. mooring deeper in the water.

There is a demand to further reduce the weight of the hybrid ropes while maintaining or desirably enhancing their performance.

DISCLOSURE OF INVENTION

It is a main object of the present invention to explore a new product to fit for the market demand.

It is another object of the present invention to devise a hybrid rope having low weight and volume in comparison with their strength and the method to produce thereof.

It is still another object of the present invention to devise a hybrid rope having a rotation resistance and sufficient corrosion resistance.

It is yet another object of the present invention to devise a hybrid rope terminated at least at one of its end by a socket and thus achieving a high breaking load level.

It is an additional object of the present invention to apply the low weight hybrid rope according to the invention in the case of great length for suspended use.

According to a first aspect of the present invention, there is provided a hybrid rope comprising a core element, a first and at least a second metallic closed layer surrounding said core element. The core element includes a bundle or construction of synthetic yarns. The first metallic closed layer includes a plurality of first wirelike members helically twisted together around the core element in a first direction. The second metallic closed layer includes a plurality of second wirelike members helically twisted together around said core element and said first metallic closed layer in a second direction. The cross-sectional area of the core element is larger than the total cross-sectional area of the first and second metallic closed layers.

The ratio of the cross-sectional area of the core element to the total cross-sectional area of the first and second metallic closed layers is preferably 70:30, and more preferably 65:35 and most preferably 60:40. The ratio of the core element to the outer metallic layers, i.e. the ratio of synthetic yarns to metal, determines the weight of rope taken up by itself. This is a large part of the load-bearing capacity of the rope. Compared with a heavy full steel rope, this hybrid rope can lower weight up to 40% or above. In other words, this rope having significantly reduced weight, e.g. being used in mooring offshore platforms, can be used in larger water columns. As a reference, a full steel rope can go to maximum to 1500 to 2500 m water depth, while the hybrid rope characterized in about 40% or more weight reduction can go to as deep as 3500 to 4000 m water depth.

Simultaneously, it should also be noted that two metallic closed layers are used outside the core element made of synthetic yarns. In a preferred example, the ratio of the cross-sectional area of the core element to the metallic closed layers is around 65:35. This renders the rope to be robust while remaining a relatively high elastic modulus. This cannot be realized by merely reducing the diameter of the wires of the hybrid rope in the prior art as shown in FIG. 1. A reduction of the wire diameter in single metallic outer layer hybrid rope will make the rope less robust. More importantly, it is found in the invention, in case of only one metallic layer outside the synthetic core, when the diameter of the metallic wires is getting very small, the outer metallic wires have "spring effect", which means one or more of the wires are not in their position. This bad positioning can occur under no tension or under tension. However, the metallic wires according to the rope construction of present application can be well positioned due to the balance of at least the two outer metallic layers and the choice of the diameter of the wirelike metallic members.

The hybrid rope has a diameter in the range of 10 to 400 millimeter, e.g. 50 millimeter, 100 millimeter and 200 millimeter. The hybrid rope preferably further comprises a jacket surrounding the first and/or second metallic closed layer. The jacket on the rope may comprise a thermoplastic, plastomer, braided cover and/or elastomer.

As an example, the wirelike members are steel wires and/or steel wire strands. The wires of the rope may be made of high-carbon steel. A high-carbon steel has a steel composition as follows: a carbon content ranging from 0.5% to 1.15%, a manganese content ranging from 0.10% to 1.10%, a silicon content ranging from 0.10% to 1.30%, sulfur and phosphorous contents being limited to 0.15%, preferably to 0.10% or even lower; additional micro-alloying elements such as chromium (up to 0.20%-0.40%), copper (up to 0.20%) and vanadium (up to 0.30%) may be added. All percentages are percentages by weight.

Preferably, the steel wires and/or steel wire strands of at least one metallic layer are coated individually with zinc and/or zinc alloy. More preferably, the coating is formed on the surface of the steel wire by galvanizing process. A zinc aluminum coating has a better overall corrosion resistance than zinc. In contrast with zinc, the zinc aluminum coating is more temperature resistant. Still in contrast with zinc, there is no flaking with the zinc aluminum alloy when exposed to high temperatures. A zinc aluminum coating may have an aluminum content ranging from 2 wt % to 12 wt %, e.g. ranging from 5% to 10%. A preferable composition lies around the eutectoid position: aluminum about 5 wt %. The zinc alloy coating may further have a wetting agent such as lanthanum or cerium in an amount less than 0.1 wt % of the zinc alloy. The remainder of the coating is zinc and unavoidable impurities. Another preferable composition contains about 10% aluminum. This increased amount of aluminum provides a better corrosion protection than the eutectoid composition with about 5 wt of aluminum. Other elements such as silicon and magnesium may be added to the zinc aluminum coating. More preferably, with a view to optimizing the corrosion resistance, a particular good alloy comprises 2 to 10% aluminum and 0.2% to 3.0% magnesium, the remainder being zinc.

Preferably, the steel wires and/or steel wire strands are end galvanized. In other words, there is no further drawing carried out for the coated wires or wire stands. Thus, a higher coating weight and a better corrosion resistance are obtained together with a high yield strength. This is especially important for offshore mooring applications where the lifetime is around 20 years.

As an example, the diameter of the first wirelike members is different from the second diameter of the second wirelike members. In another example, the diameter of the first wirelike members is equal to the second diameter of the second wirelike members. The diameter of the wirelike members may vary between 0.30 mm to 30 mm. As an example, the first metallic closed layer includes at least 20 first wirelike members and the second metallic closed layer includes more than 20 second wirelike members.

The spin efficiency of the wirelike members is more than 90%. In an preferred example, the spin efficiency is 95%, meaning wires loose only 5 of strength during spinning. The very low spin loss is achieved by combining any one or more of the features as described above or later: the wires are end galvanized (cross points are less relevant than in end drawn wires); the core and the external layers have designed with a certain lay length that increases the efficiency; the rope construction has low torque; the rope can be terminated with a special socket design.

Preferably, the first twist direction of the first metallic layer and the second twist direction of the second metallic layer are different lay directions. As an example, the first metallic layer is twisted in "S" direction and the second metallic layer is twisted in "Z" direction. As another example, the first metallic layer is twisted in "Z" direction and the second metallic layer is twisted in "S" direction. The "S" and "Z" torque is balanced and therefore the hybrid rope is non-rotating.

The core element is preferably a rope made of synthetic yarns. The core may have any construction known for synthetic ropes. The core may have a plaited, a braided, a laid, a twisted or a parallel construction, or combinations thereof. Preferably the core has a laid or a braided construction, or a combination thereof.

In such rope constructions, the ropes are made up of strands. The strands are made up of rope yarns, which contain synthetic fibers. Methods of forming yarns from fiber, strands from yarn and ropes from strands are known in the art. Strands themselves may also have a plaited, braided, laid, twisted or parallel construction, or a combination thereof.

For a further description of rope constructions, see for example "Handbook of fibre rope technology", McKenna, Hearle and O'Hear, 2004, ISBN 0-8493-2588-9.

Synthetic yarns that may be used as the core of the hybrid rope according to the invention include all yarns, which are known for their use in fully synthetic ropes. Such yarns may include yarns made of fibers of polypropylene, nylon, polyester. Preferably, yarns of high modulus fibers are used, for example yarns of fibers of liquid crystal polymer (LCP), aramid such as poly(p-phenylene terephthalamide) (known as Kevlar®), high molecular weight polyethylene (HM-wPE), ultra-high molecular weight polyethylene (UHM-wPE) such as Dyneema® and PBO (poly(p-phenylene-2,6-benzobisoxazole). The high modulus fibers preferably have a break strength of at least 2 MPa and tensile modulus preferably above 90 GPa. The diameter of the core element may vary between 2 mm to 300 mm.

A plastomer, thermoplastic, braided cover and/or elastomer may also be coated or extruded on the exterior of the rope according the invention. The coating has an average thickness of at least 0.1 mm, more preferably at least 0.5 mm. Said thickness is at most 50 mm, preferably at most 30 mm, more preferably at most 10 mm and most preferably at most 3 mm.

The core element may be coated with a plastomer, thermoplastic, braided cover and/or elastomer. The plastomer may be a semi-crystalline copolymer of ethylene or propylene and one or more C2 to C12 α-olefin co-monomers and the plastomer having a density as measured according to ISO1183 of between 870 and 930 kg/m$^3$. Alternatively, the core may also be coated with a thermoplastic, preferably by extrusion. The thermoplastic may be high-molecular-weight polymers, e.g. Polyethylene (PE), Polypropylene (PP), Polyurethane (PU) and Polyvinyl chloride (PVC). Using the coating of the plastomer, thermoplastic and/or elastomer on the core element in the hybrid rope also ensures that the core element is protected against abrasion due to the movement of the outer metallic wire strands when the rope is in use. Less slippage occurs between the core and the outer metallic layer.

A preferred coating can be found in WO2011/154415, which also provides further details on how to obtain a core element according to the present invention.

Figure 2:
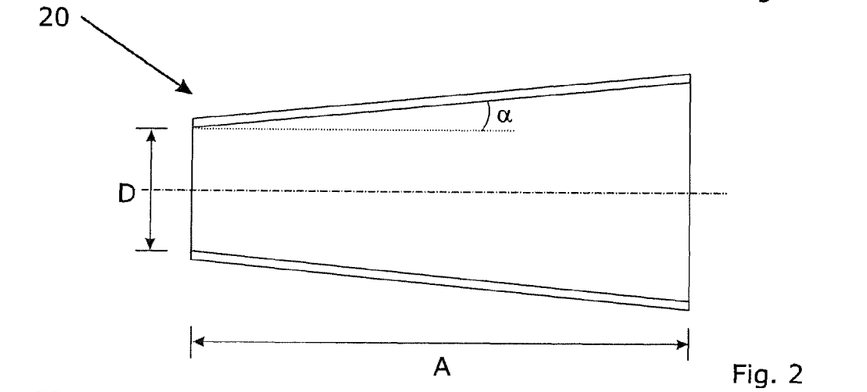
FIG. 2 is an intersection of a socket used for the hybrid rope according to the invention.
Figure 3:
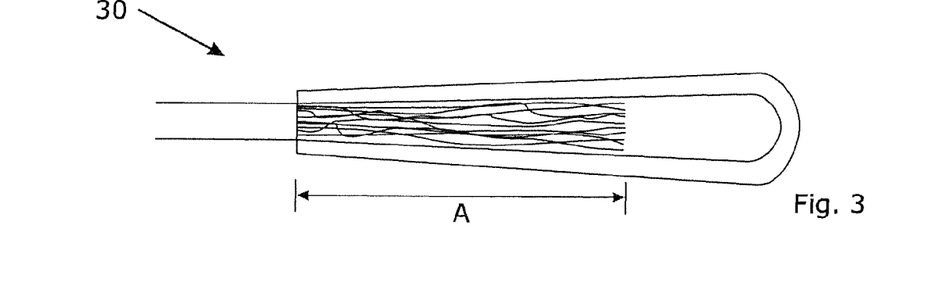
FIG. 3 is a socket used for the hybrid rope according to the invention in longitudinal direction.

According to a second aspect of the present invention, there is provided an assembly of a hybrid rope and a socket. The hybrid rope according to the invention is terminated at least at one of its ends by a socket 30. The socket has a conically shaped space 20 as shown in FIG. 2. The conically shaped space of the socket has a conical angle α of between 2 and 8° and a length A of between 5D and 20D when D is defined as the smallest diameter of the conically shaped space. The steel wires have been untwisted at said at least one of the ends as shown in FIG. 3. The open space around the untwisted wires and core in the hollow conical body of the socket is filled with a resin.

The hybrid rope according to the invention fits well with the above socket. Because of the use of the special socket, the rope breaks at higher loads, even being better than a full steel rope with similar diameter. Additionally, the rope is neither pulled out of the socket nor breaks at the socket outlet but breaks between the sockets in the free standing part of the ropes. The assembly of the hybrid rope with the socket works so well that we achieve spin efficiencies more than 95%.

A preferred assembly of a hybrid rope and a socket can be found in WO2011/083126, which also provides details on how to apply the socket.

The invention ropes can be used for e.g. mooring offshore platforms or deep sea installation which make it possible to go deeper with their lighter weight compared with full steel ropes. The invention ropes are lighter, strong and thus suitable to be applied as aerial ropes, e.g. for cableway or "teleferic". In contrast to the conventional aerial ropes, the application of the invention ropes obtains a higher cable span in addition to less sag. As another example, the invention rope can also applied as hoist or hauling ropes for traction winches or mining. An existing hoist rope for mining has normally a weight around 15 kg/m. This means the weight of rope by itself already takes up 30 tons if a 2 km length rope is in use. When a same length of invention rope having a weight of about 8 kg/m is used, then the weight of rope is only 16 tons. Therefore, the invention hybrid ropes significantly increase the load-bearing capacity or payload and provide the possibility of digging deeper mines. Moreover, the invention hybrid ropes due to their light weight are also beneficial for structural constructions, e.g. for bridges or stadiums, commercial fishing, cranes, elevators, installation.

According to a third aspect of the present invention, there is provided a method of producing a hybrid rope comprising a core element, a first and a second metallic closed layer, wherein the cross-sectional area of the core element is larger than the total cross-sectional area of the first and second metallic closed layers. It comprises the steps of providing the core element which includes a bundle or construction of synthetic yarns; twisting a plurality of first wirelike members together with the core element in a first direction to form the first metallic closed layer; twisting a plurality of second wirelike members together with said core element and said first metallic closed layer in a second direction to form the second metallic closed layer. It may further comprises a step of preforming each of the wirelike members to set a predetermined helical twist prior to twisting. It may further comprises a step of extruding the core, interlayer and complete rope with a plastomer, thermoplastic, braided cover and/or elastomer to form a jacket outside the second metallic closed layer.

The invention hybrid ropes are applied in particular in the case of ropes of great length for suspended use, such as hauling or hoisting ropes in mining, cranes and elevators, aerial ropes or ropes for deep sea installations or use in marine and commercial fishing applications, and offshore mooring. This is because, during such use, the weight of rope by itself already takes up a large part of its load-bearing capacity and winch load capacity; the payload is correspondingly limited. Therefore, the invention hybrid ropes are desirable in these operations since they provide comparable performance with steel ropes and lower weight expanding the possibilities, e.g. mooring deeper in the water.

The invention illustratively described herein may suitably be practiced in the absence of any element or elements, limitation or limitations, not specifically disclosed herein. Thus, for example, the terms "comprising", "including", "containing", etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the invention claimed. For example, three metallic layers may be applied outside the fiber core; thermoplastic coatings may be applied outside each of the metallic layers. Thus, it should be understood that although the present invention has been specifically disclosed by preferred embodiments and optional features, modification and variation of the inventions embodied herein disclosed may be resorted to by those skilled in the art, and that such modifications and variations are considered to be within the scope of this invention.

BRIEF DESCRIPTION OF FIGURES IN THE DRAWINGS

The invention will be better understood with reference to the detailed description when considered in conjunction with the non-limiting examples and the accompanying drawings, in which.

MODE(S) FOR CARRYING OUT THE INVENTION

Hybrid Rope 1

Figure 4:
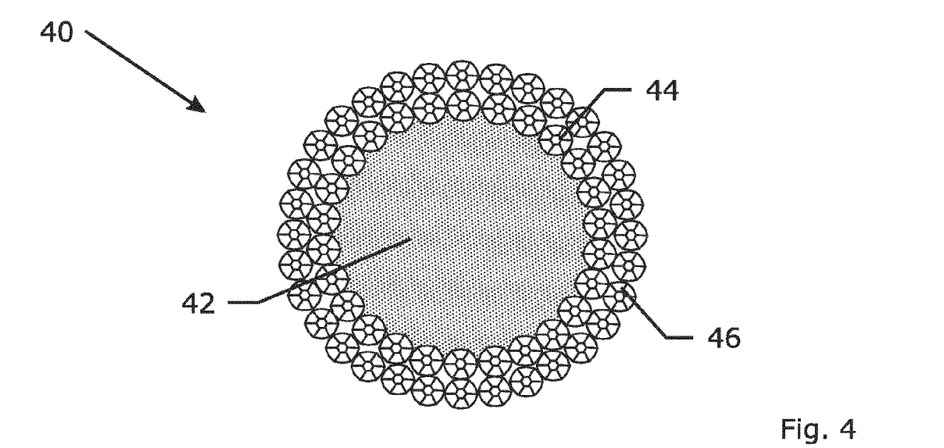
FIG. 4 is a cross-section of an invention hybrid rope according to the first embodiment of the invention.

FIG. 4 is a cross-section of an invention hybrid rope according to the first embodiment of the invention. The invention hybrid rope 40 comprises a fiber core 42, first metallic wirelike members 44 and second metallic wirelike members 46. The hybrid rope 40 may have a diameter ranging from 10 mm to 400 mm. The hybrid rope 40 as illustrated in FIG. 4 has a "32×7c+26×7c+FC SsZs, SzZz or ZzSz" rope construction. The term "32×7c+26×7c+FC SsZs" refers to a rope design with the second metallic layer (most outside layer) having 32 strands (i.e. second metallic wirelike members 46) with a rotating direction of "S", wherein each strand contains 7 compacted filaments with a rotating direction of "s", the first metallic layer having 26 strands (i.e. first metallic wirelike members 44) with a rotating direction of "Z", wherein each strand contains 7 compacted filaments with a rotating direction of "s", and a fiber core (abbreviated as FC). The rope construction as shown in table 1 are denoted in a similar way. The metallic members 44, 46 of the hybrid rope 40 as shown in FIG. 4 have an identical dimension and filament strand constructions. Alternatively, the metallic members may have different diameter and/or the other filament strand constructions. Table 1 gives the details of some example hybrid ropes, but not limits the present invention.

The core 42 is made of a plurality of high modulus polyethylene (HMPE) yarns, e.g. any one or more rope yarns of 8*1760 dTex Dyneema® SK78 yarn, 4*1760 dTex Dyneema® yarn or 14*1760 dTex Dyneema® 1760 dTex SK78 yarn. The core 42 can be made of a bundle of continuous synthetic yarns or braided strands. As an example, in a first step a 12 strand braided first core part was produced, each strand consisting of 8*1760 dTex Dyneema® SK78 yarn. This first core part is overbraided with 12 strands of 4*1760 dTex Dyneema® yarn.

In this embodiment, the diameter of the first metallic wirelike members 44 may be the same or different from the second wirelike members 46 (see table 1). The metallic wirelike members 44,46 as an example illustrated herewith are stands having a plurality of substantially identical metallic filaments. It should be understood that the metallic wirelike members may have different strand configuration. In addition, the metallic layers may include metallic wirelike members with different strand configuration. It should be understood that the metallic layers may also comprise a combination of filament strands and single steel wires.

Hybrid Rope 2

Figure 5:
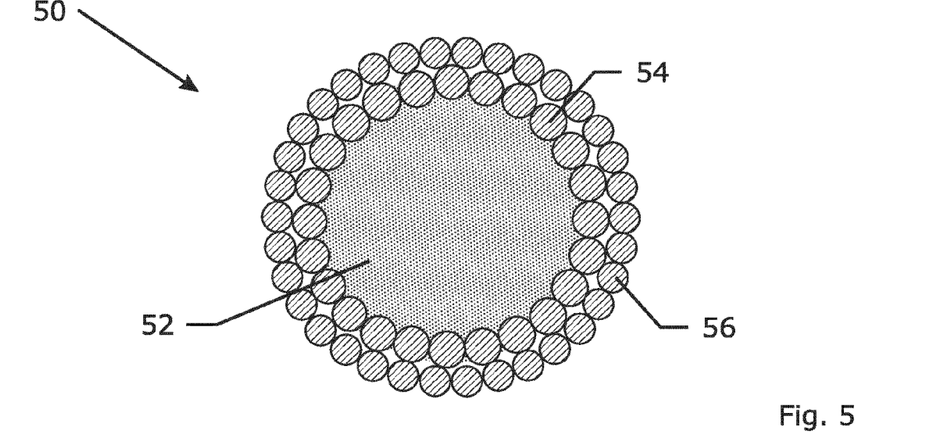
FIG. 5 is a cross-section of an invention hybrid rope according to the second embodiment of the invention.

FIG. 5 is a cross-section of an invention hybrid rope according to the second embodiment of the invention. The invention hybrid rope 50 comprises a fiber core 52, first metallic wirelike members 54 and second metallic wirelike members 56. FIG. 5 schematically shows, as an example, a hybrid rope having a construction of "34+24+FC SZ". Being differential from the first embodiment, the metallic wirelike members 44,46 are each replaced by a single steel wire 54,56. The hybrid rope has a construction of "34+24+FC SZ", meaning that the hybrid rope has a fiber core, the first metallic layer with a rotating direction of "S" having 24 wires and the second metallic layer with a rotating direction of "Z" having 32 wires. The particulars of some possible hybrid rope constructions are given in table 2. It should be understood that the metallic layers may also comprise a combination of filament strands and single steel wires.

TABLE 1

| Rope construction | Rope diameter (mm) | Torque factor | Core diameter (mm) | First metallic member diameter (mm) | Second metallic member diameter (mm) | Core section (% of area) |
| --- | --- | --- | --- | --- | --- | --- |
| 32 × 7c + 26 × 7c + FC SsZs | 22 | 0.033 | 14.8 | 1.8 | 1.8 | 57.4 |
| 32 × 7c + 26 × 7c + FC SzZz | 22 | 0.044 | 14.8 | 1.8 | 1.8 | 57.4 |
| 32 × 7c + 26 × 7c + FC ZzSz | 22 | −0.033 | 14.8 | 1.8 | 1.8 | 57.4 |
| 34 × 7c + 24 × 7c + FC SsZs | 22 | 0.019 | 14.6 | 2.0 | 1.7 | 56.8 |
| 34 × 7c + 24 × 7c + FC SzZz | 22 | 0.031 | 14.6 | 2.0 | 1.7 | 56.8 |
| 34 × 7c + 24 × 7c + FC ZzSz | 22 | −0.019 | 14.6 | 2.0 | 1.7 | 56.8 |
| 32 × 7c + 26 × 7c + FC SsZs | 100 | 0.033 | 67.2 | 8.2 | 8.2 | 57.4 |
| 32 × 7c + 26 × 7c + FC SzZz | 100 | 0.044 | 67.2 | 8.2 | 8.2 | 57.4 |
| 32 × 7c + 26 × 7c + FC SzZz | 100 | 0.034 | 66.0 | 8.5 | 8.5 | 54.9 |
| 32 × 7c + 26 × 7c + FC ZzSz | 100 | −0.033 | 67.2 | 8.2 | 8.2 | 57.4 |
| 32 × 7c + 26 × 7c + FC ZzSz | 100 | −0.022 | 66.0 | 8.5 | 8.5 | 54.9 |
| 34 × 7c + 24 × 7c + FC SsZs | 100 | 0.019 | 66.6 | 9.0 | 7.7 | 56.8 |
| 34 × 7c + 24 × 7c + FC SzZz | 100 | 0.031 | 66.6 | 9.0 | 7.7 | 56.8 |
| 34 × 7c + 24 × 7c + FC ZzSz | 100 | −0.019 | 66.6 | 9.0 | 7.7 | 56.8 |

TABLE 2

| Rope construction | Rope diameter (mm) | Torque factor | Core diameter (mm) | First metallic member diameter (mm) | Second metallic member diameter (mm) | Core section (% of area) |
| --- | --- | --- | --- | --- | --- | --- |
| 26 + 32 + FC SZ | 22 | 0.026 | 14.6 | 1.4 | 2.3 | 51.65 |
| 32 + 26 + FC SZ | 22 | 0.013 | 14.6 | 1.9 | 1.9 | 52.06 |
| 32 + 32 + FC ZS | 22 | 0.017 | 15.2 | 1.5 | 1.9 | 55.65 |
| 34 + 24 + FC SZ | 22 | 0.01 | 14.4 | 2.0 | 1.8 | 51.29 |
| 26 + 32 + FC SZ | 100 | 0.026 | 66.2 | 6.7 | 10.2 | 51.65 |
| 32 + 26 + FC SZ | 100 | 0.013 | 66.2 | 8.5 | 8.5 | 52.06 |
| 32 + 32 + FC ZS | 100 | 0.017 | 69.2 | 7.0 | 8.4 | 55.65 |
| 34 + 24 + FC SZ | 100 | 0.01 | 65.6 | 9.2 | 8.0 | 51.29 |

Hybrid Rope 3

Figure 6:
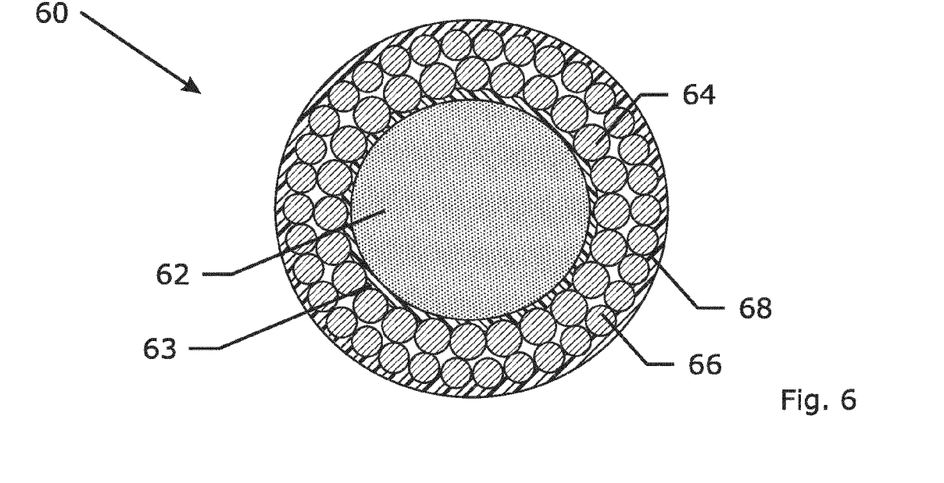
FIG. 6 is a cross-section of an invention hybrid rope according to the third embodiment of the invention.

FIG. 6 is a cross-section of an invention hybrid rope according to the third embodiment of the invention. As an example, the illustrated hybrid rope has a construction of "34+24+FC SZ". The invention hybrid rope 60 comprises a fiber core 62, a extruded thermoplastic layer 63 around the core 62, first metallic wirelike members 64, second metallic wirelike members 66 and a thermoplastic protection layer 68.

As an example, a coating of a plastomer EXACT™ 0230 is extruded on the core of the rope using a Collin™ 45 mm single screw extruder. Polyethylene (PE) is extruded on the entire rope as a protection layer.

It goes without saying that either only an extruded coating on the core (and no extruded layer on the entire rope) or merely an extruded layer on the entire rope (and no extruded coatings on the core) are also within the scope of the invention. In addition, an additional coating/extruded layer can be added in between the two metallic layers to avoid fretting in between the metallic layers.

Hybrid Rope with Socket

As an example, hybrid rope having a construction of "32+26+FC SZ" is connected to a socket as shown in FIGS. 2 and 3. The conically shaped space of the socket has the dimensions: A=8.8D (D is the diameter of the rope) α=2°30'.

Both ends of the ropes are terminated with the socket. The end of the rope is put through the small diameter opening of the socket. Then the rope and the strands of the rope are untwisted over a distance of A+D. Thereafter the wires and yarns of the rope are spread into the shape of the hollow conically shaped space of the socket. The untwisted and spread end of the rope is thereafter pulled into the conically shaped space. The socket containing the untwisted and spread end of the rope is placed in a vertical position, with the wide opening of the conically shaped space of the socket pointing in upward direction.

After that an unsaturated polyester two component resin, e.g. Socket Fast Blue™, or epoxy two component resin is mixed and poured into the socket, to fill the open spaces between the yarns and wires of the unraveled and spread rope end. The resin is allowed to cure for a period of 24 hours at room temperature (~20° C.). The length of the ropes is 4 m.

The ropes are tested according to ISO 2307. The ropes are attached by their sockets to a standard rope break test equipment. The rope are pre-tensioned 5 times to about 50% of their expected strength indicated by breaking load (BL). Thereafter the ropes were tensioned until breaking. The breaking strength of the ropes is reported in table 3. Three hybrid ropes with the same configuration are individually tested and deviation is also given in table 3. As a reference, full steel half/full-lock steel rope and polyester rope are also listed.

TABLE 3

| Rope type | Rope construction | Diameter (mm) | Linear weight (kg/m) | BL (tons) | E-modulus (GPa) |
|---|---|---|---|---|---|
| Hybrid | 32 + 26 + FC SZ | 22.5 ± 0.5 | 1.48 ± 0.5 | 47.8 ± 1.0 | 90-100 |
| Full steel | Half/full-lock Strand | 22 | ~2.75 | ~41.8 | 140-150 |
|  |  | 22 | ~2.38 | 40.9 |  |
| Polyester | parallel strand or parallel yarn | 40-45 | ~1.20 | 40-45 | 20-30 |

The tested hybrid ropes present consistent results. The E-modulus of the hybrid rope is in between the range of full steel and polyester ropes. It should be noted that the given E-modulus values for ropes listed under Table 3 are typically expected values other than hybrid rope. Compared with a full steel wire having a similar diameter, the hybrid rope lower the weigh by 37-46% while enhance the breaking load by 4-17%. In contrast to the polyester rope, although the hybrid rope has 25% higher linear weight, the diameter of the polyester rope is about two times of that of the hybrid rope in order to achieve a similar break strength.

The quasi-dynamic stiffness is also evaluated on 22 mm hybrid rope (A) and 22 mm full steel rope (strand, 35×K7) (B). The stiffness values measured correspond to those required to dimension mooring lines for station-keeping, and are based on the work performed to certify synthetic fibre ropes for these applications (Del Vecchio C J M, 1992, Light-weight materials for deep water moorings, PhD thesis University of Reading; Francois M, Davies P, 2008, Characterization of polyester mooring lines, OMAE 2008-57136). Tests to determine quasi-dynamic stiffness are carried out as defined in both international standards (ISO 18692, 2007, Fibre ropes for offshore station keeping Polyester) and classification society rules (Bureau Veritas, 2007, Certification of fibre ropes for deep water offshore services, NI432R01).

Figure 7:
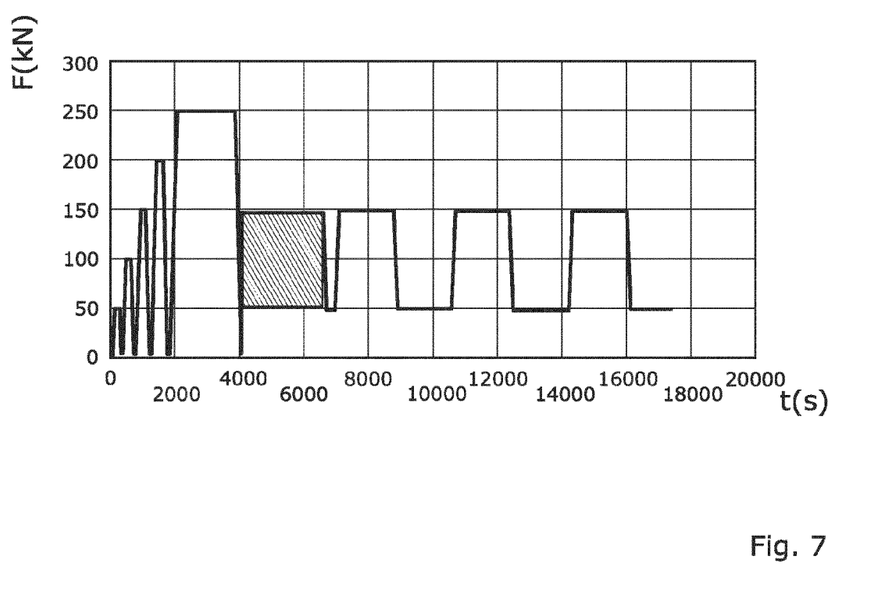
FIG. 7 shows a loading scheme for quasi-dynamic measurement.
Figure 8:
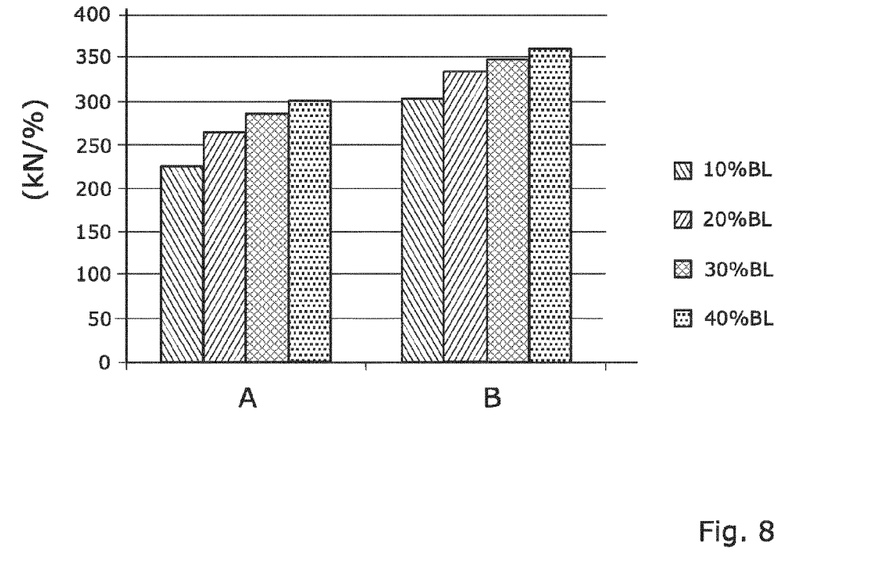
FIG. 8 shows comparisons of quasi-dynamic stiffness values of hybrid rope (A) and full steel rope (B) at different breaking load levels.
Figure 9:
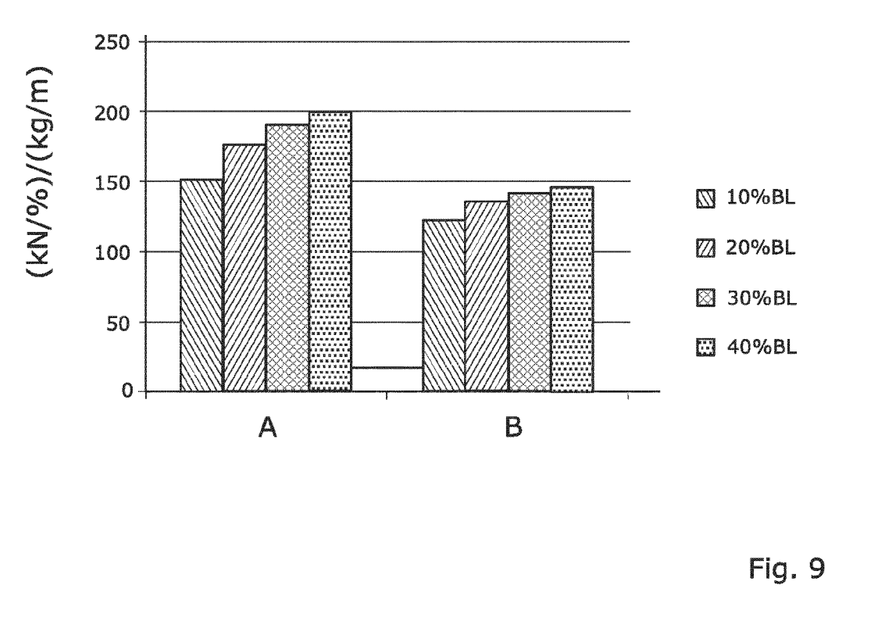
FIG. 9 shows comparisons of quasi-dynamic specific stiffness values of hybrid rope (A) and full steel rope (B) at different breaking load levels.

The loading scheme for quasi-dynamic measurement is shown in FIG. 7. The abscissa is time in the unit of second (s) and the ordinate is the applied load in the unit of kN. The mean load applied is 10%, 20%, 30% and 40% of the breaking load (BL) of the wire rope. The quasi-dynamic stiffness values of hybrid rope (A) and full steel rope (B) are shown and compared in FIG. 8. The quasi-dynamic stiffness of both ropes increases significantly with increasing mean load over the applied range of loads (10-40% of BL). The quasi-dynamic stiffness of hybrid rope (A) is 17-26% lower than the full steel rope (B). However, the advantage of hybrid rope over full steel rope appears when taking the weight into account. Specific stiffness is defined as the ratio of stiffness to linear weight. As shown in FIG. 9, the specific stiffness of hybrid rope (A) is 22-37% higher than that of full steel rope (B) over the tested load range.

Figure 10:
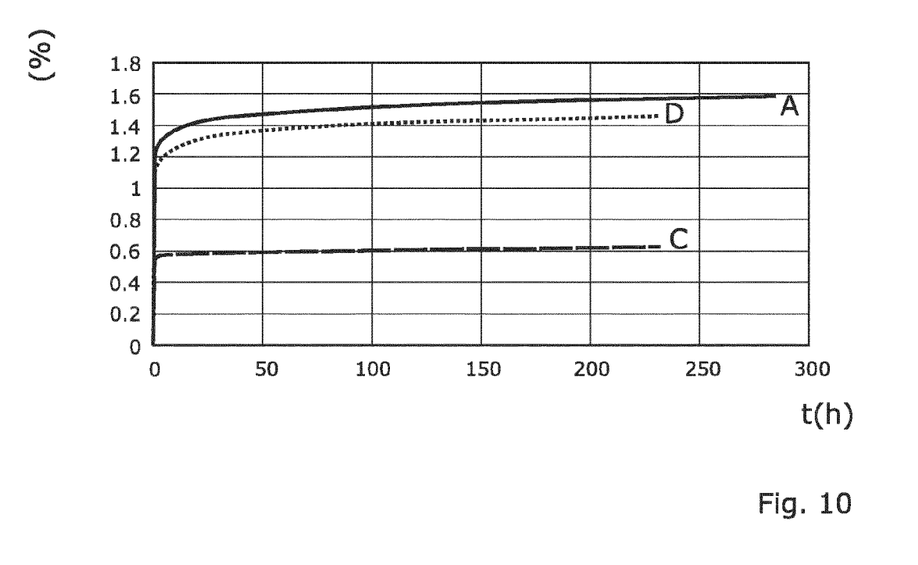
FIG. 10 shows creep over time at constant loads of hybrid ropes (A,D) and full steel rope (C).

In addition, creep over time at constant loads are evaluated in FIG. 10. Creep is defined as wire rope deformation (elongation) under a constant, static loading situation. A 22 mm multi-strand hybrid rope (A) is compared with 13 mm 8-strand full steel rope (C) and 13 mm 8-strand hybrid rope (D). The applied load on 22 mm multi-strand hybrid rope (A) is 50% BL while on 13 mm 8-strand full steel rope (C) and 13 mm 8-strand hybrid rope (D) is 40% BL. The temperatures of wire rope were kept at about 50° during 10 days measurement. The creep was measured as a change of strain (%) over time (h). As shown in FIG. 10, hybrid rope (A) presents a bigger strain than full steel rope (C) at the moment of applying load which is as expected from a fiber core rope. However, over time at constant load, hybrid rope (A) shows a similar strain change compared to full steel wire rope (C). Compared with 8-strand hybrid rope (D), more load is applied on the invention multi-strand hybrid rope (A) (50% BL vs. 40% BL). In addition, the relative cross-section area of core is bigger in multi-strand hybrid rope (A). Even with these facts, the creep rate of multi-strand rope (A) is significantly low. Therefore, creep does not become problematic over time for the invention hybrid rope.

LIST OF REFERENCES 10 composite cable
12 synthetic core 14 metal jacket
16 wire
20 conically shaped space of the socket
30 hybrid rope terminated at its end by a socket
40 hybrid rope 1
42 fiber core
44 first metallic wirelike member
46 second metallic wirelike member
50 hybrid rope 2
52 fiber core
54 first metallic wirelike member
56 second metallic wirelike member
60 hybrid rope 3
62 fiber core
63 thermoplastic layer
64 first metallic wirelike member
66 second metallic wirelike member
68 thermoplastic protection layer

The invention claimed is:

1. A hybrid rope, comprising a core element, a first and a second metallic closed layer surrounding said core element,
   wherein the core element includes a bundle or construction of synthetic yarns,
   the first metallic closed layer includes a plurality of first wirelike members helically twisted together around the core element in a first direction,
   the second metallic closed layer includes a plurality of second wirelike members helically twisted together around said core element and said first metallic closed layer in a second direction,
   and wherein the cross-sectional area of the core element is larger than the total cross-sectional area of the first and second metallic closed layers.

2. The hybrid rope as in claim 1, wherein the ratio of the cross-sectional area of the core element to the total cross-sectional area of the first and second metallic closed layers is 60:40.

3. The hybrid rope as in claim 1, wherein said hybrid rope has a diameter in the range of 10 to 400 millimeter.

4. The hybrid rope as in claim 1, further comprising a jacket surrounding the second metallic closed layer, said jacket comprising a plastomer, thermoplastic, a braided cover and/or elastomer.

5. The hybrid rope as in claim 1, wherein the wirelike members are steel wires and/or steel wire strands.

6. The hybrid rope as in claim 5, wherein the steel wires and/or steel wire strands are coated with zinc and/or zinc alloy.

7. The hybrid rope as in claim 5, wherein the steel wires and/or steel wire strands are end galvanized.

8. The hybrid rope as in claim 1, wherein said first wirelike members have a first diameter, said second wirelike members have a second diameter, and the first diameter is different from the second diameter.

9. The hybrid rope as in claim 1, wherein said first wirelike members have a first diameter, said second wirelike members have a second diameter, and the first diameter is equal to the second diameter.

10. The hybrid rope as in claim 1, wherein the spin efficiency of the wirelike members is more than 90%.

11. The hybrid rope as in claim 1, wherein the first twist direction and the second twist direction are different lay directions.

12. The hybrid rope as in claim 1, wherein the core has a laid or a braided construction and the core element is coated with a plastomer, thermoplastic, braided cover and/or elastomer.

13. An assembly of a hybrid rope and a socket, wherein the hybrid rope is as in claim 1 and the rope is terminated at least at one of its ends by a socket having a conically shaped space, and wherein the conically shaped space of the socket has a conical angle α of between 2 and 8° and a length A of between 5D and 20D, D being the smallest diameter of the conically shaped space, steel wires having been untwisted at said at least one of the ends, an open space around the untwisted wires and core in the socket being filled with a resin.

14. A method of producing a hybrid rope comprising a core element, a first and a second metallic closed layer, wherein the cross-sectional area of the core element is larger than the total cross-sectional area of the first and second metallic closed layers, comprising the steps of:
   (a) providing the core element, wherein said core element includes a bundle or construction of synthetic yarns;
   (b) twisting a plurality of first wirelike members together around the core element in a first direction to form the first metallic closed layer;
   (c) twisting a plurality of second wirelike members together around said core element and said first metallic closed layer in a second direction to form the second metallic closed layer.

15. A method of producing a hybrid rope as in claim 14, further comprising the step of:
   (d) coating the rope with a plastomer, thermoplastic, a braided cover and/or elastomer to form a jacket outside the second metallic closed layer.

* * * * *